United States Patent
Murray

[11] Patent Number: 5,608,279
[45] Date of Patent: Mar. 4, 1997

[54] DC GENERATOR

[76] Inventor: David E. Murray, 33 Ashmont St., Dorchester, Mass. 02124

[21] Appl. No.: 312,393

[22] Filed: Sep. 26, 1994

Related U.S. Application Data

[63] Continuation-in-part of Ser. No. 165,599, Dec. 13, 1993, abandoned.

[51] Int. Cl.$^6$ .................................................. H02K 11/00
[52] U.S. Cl. .......................................... 310/156; 310/194
[58] Field of Search ..................................... 310/156, 177, 310/179, 180, 181, 184, 194, 195, 254, 257–259, 264, 271

[56] References Cited

U.S. PATENT DOCUMENTS

| | | | |
|---|---|---|---|
| 260,652 | 7/1882 | Brush | 310/194 |
| 747,595 | 12/1903 | Kaiser | 310/194 |
| 747,631 | 12/1903 | Osborne | 310/194 |
| 1,726,042 | 8/1929 | Reis | 310/168 X |
| 3,134,918 | 5/1964 | Eichenberger et al. | 310/168 |
| 3,621,313 | 11/1971 | Walton | 310/49 |
| 3,845,835 | 11/1974 | Petit | 180/65 R |
| 4,110,718 | 8/1978 | Odor et al. | 310/154 X |
| 4,112,320 | 9/1978 | Mohr | 310/154 |
| 4,237,397 | 12/1980 | Mohr et al. | 310/156 X |
| 4,292,558 | 9/1981 | Flick et al. | 310/194 |
| 4,348,628 | 9/1982 | Loucks | 320/61 |
| 4,547,758 | 10/1985 | Shimizu et al. | 335/302 |
| 4,583,696 | 4/1986 | Mosher | 310/194 X |
| 4,751,415 | 6/1988 | Kitamori et al. | 310/156 |
| 4,758,756 | 7/1988 | Pouillange | 310/156 X |
| 4,775,813 | 10/1988 | Janson | 310/156 X |
| 4,780,634 | 10/1988 | Masterman | 310/179 |
| 5,191,256 | 3/1993 | Reiter, Jr. et al. | 310/156 |
| 5,457,870 | 10/1995 | Canders | 310/156 X |

FOREIGN PATENT DOCUMENTS

| | | |
|---|---|---|
| 3-82348 | 4/1991 | Japan . |
| 514351 | 1/1938 | United Kingdom . |

*Primary Examiner*—Mark O. Budd
*Attorney, Agent, or Firm*—Richard C. Litman

[57] ABSTRACT

An improved permanent magnet DC generator includes at least one stator arranged normal to a rotor. Preferably, there are a plurality of stators each having successive strata of windings in a first direction, windings in a second direction, and a core comprising a surrounding sheet of magnetizable material. The windings and core are separated by electrical insulation. The stator may be constructed to include recurring patterns of windings and cores as described above, all windings being formed from a continuous conductive filament. A stator is preferably includes a non-conductive base attachable to the generator by threaded fasteners. The rotor includes a pair of diametrically opposed magnet groups. Within each group, there is a leading magnet, a plurality of central magnets, and a trailing magnet. Individual magnets are arranged such that the forward face of the leading magnet, the outer face of the central magnets, and the rear face of the trailing magnet all expose like poles to the stator. A consistent magnetic orientation is thus imposed upon the stator, and parasitic internal losses are thus avoided. The magnets project rearwardly from the rotor, and partly overlap or surround the motor driving the rotor. This helps stabilize the rotor at high rotational speeds. The rotor is potted in epoxy and banded circumferentially with wire to help retain the magnets in place at high rotational speeds.

15 Claims, 3 Drawing Sheets

1
DC GENERATOR

REFERENCE TO RELATED APPLICATION

This application is a Continuation-In-Part of Ser. No. 08/165,599, filed Dec. 13, 1993, abandoned.

BACKGROUND OF THE INVENTION

1. Field of the Invention

The present invention relates to a generator for converting mechanical energy to electrical energy.

2. Description of the Prior Art

Construction of generators, as related to efficiency, and applications of generators are illustrated in the following prior art patents.

U.S. Pat. No. 1,726,042, issued to Curt F. Reis on Aug. 27, 1929, discloses a generator having a rotor bearing permanent magnets. These magnets are at least partially encircled with ferromagnetic metal to control eddy currents and to increase permeability of local portions of the magnetic field. This limited use of the ferromagnetic metal part does not imply the ability to retain magnetic flux about a stator which derives power from a field of magnetic flux.

U.S. Pat. No. 3,134,918, issued to Carl G. Eichenberger et al. on May 26, 1964, discloses a signal generator wherein magnetic attraction of two relatively moving parts is provided, so that at low rotational speeds, which would produce a weak signal, there is additional, if temporary, acceleration. This additional acceleration amplifies the signal.

A plurality of ferromagnetic bars are disposed in spaced apart relation about the circumference of a non-magnetic, annular rotor body.

U.S. Pat. No. 5,447,758, issued to Motoharu Shimizu on Oct. 15, 1985, discloses a cylindrical permanent magnet having at least eight poles.

Japanese Pat. Document No. 3-82348, dated Aug. 4, 1991, discloses a rotor for a generator wherein the magnetic field is augmented by a second series of magnets placed inside an external ring of primary magnets.

U.S. Pat. Nos. 3,845,835 and 4,348,628, issued respectively to Earl W. Petit on Nov. 5, 1974 and Carl C. Loucks on Sep. 7, 1982, and U.K. Pat. Document No. 514,351, dated Jan. 22, 1938, disclose high efficiency generators for powering motor vehicles.

None of the above inventions and patents, taken either singly or in combination, is seen to describe the instant invention as claimed.

SUMMARY OF THE INVENTION

The present invention seeks to increase power and efficiency of a permanent magnet generator by improving upon the rotor and stator. The rotor includes magnets of unequal flux strength, arranged so that a selected pole is oriented outwardly and in leading and trailing positions. A plurality of magnets are assembled in abutting relation, and oriented to achieve this polar arrangement.

The advantage derived from this arrangement of magnetic poles is that a constant field is experienced by the stator. The field would vary if the other pole were partially exposed to the stator, as would occur if the leading and trailing areas of magnets where not oriented in the manner set forth above. An efficient magnetic field having a constant or consistent polar influence thus acts upon the stator.

2

The rotor magnets are arranged to overlap a motor driving the generator. Attraction of the magnets to the motor assist in maintaining stability of the rapidly rotating rotor.

In other aspects, the rotor is constructed according to prior art practice. Leading and trailing magnets in each group of abutting magnets are of greater field strength than are the interior magnets. Also, the rotor includes a wire or like member wound circumferentially around the magnets to retain the magnets in place despite centrifugal forces which would tend to urge the magnets radially outwardly.

The stator is built up by winding a single filament conductor around a central, planar base member. The conductor is wound the length of the base member, insulated, and wound again so that the two ends are now on the same side of the stator. A second layer of insulation is applied, and a band of magnetic material serving as a core is placed around the second winding. A further layer of insulation is applied around the band of magnetic materials.

The stator is then built up by repeating this pattern of windings and cores in concentric fashion. Each winding is formed from a continuation of the previous winding, so that only one filament is employed to wind each stator. Core members are thus interspersed between windings, rather than concentrated in the center of the stator. Core members may comprise individual belts surrounding a winding, or may be formed from parallel strips.

Each winding is insulated from an adjacent winding, and the windings are also insulated from the bands of magnetic material. Any number of stators may be placed around the rotor.

The stator is bolted to the generator housing, and is thus essentially independent from the rotor. Any number of stators may be assembled to the generator, and output characteristics are readily varied to suit specific applications.

Accordingly, it is a principal object of the invention to provide a more efficient and powerful generator.

It is another object of the invention to impose a consistent magnetic polar field upon the stator.

An additional object of the invention is to form a generator stator by including repeating arrangements of windings and cores.

It is again an object of the invention to form a generator stator having repeating windings formed from a single conductor.

It is a further object of the invention to provide a generator wherein magnetic flux of a rotor is constrained to bear advantageously upon the stator.

Still another object of the invention is to construct a rotor having permanent magnets attached thereto which is capable of withstanding high rotational speeds.

Yet another object of the invention is to stabilize the rotor by arranging magnets thereof to overlap a driving motor.

A still further object of the invention is to provide a rotor including magnets having like poles exposed to the stator.

Still an additional object of the invention is to provide a generator rotor having sections of magnets wherein a leading magnet is of greater field strength than a trailing magnet.

Still another object of the invention is to enable ready adjustment in the number of stators.

A further object of the invention is to intersperse stator core elements and windings.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
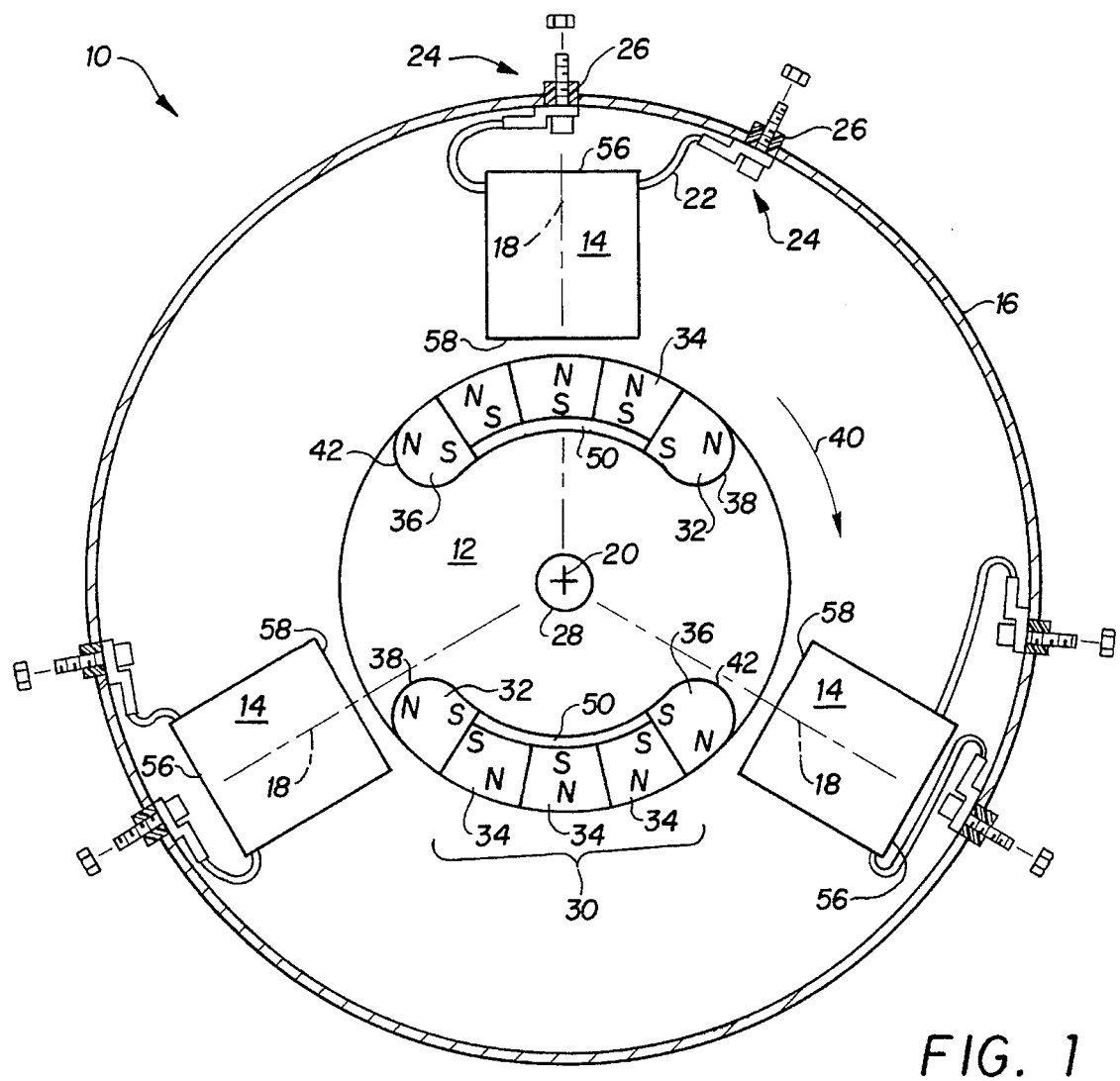
FIG. 1 is a diagrammatic, front elevational view of the invention, shown partly in cross section.

With reference to FIG. 1 of the drawings, the novel generator 10 is seen to include a rotor 12 and three stators 14 arranged radially about rotor 12, all enclosed in a housing 16. The precise number of stators is not important, and can be varied to influence the output characteristics of generator 10 as desired. Stators 14 are firmly secured to housing 16, as by bolting or by epoxy potting (not shown), or by any suitable method, and is located in close proximity to rotor 12 at a fixed or static location within generator 10.

Each stator 14 has a longitudinal axis 18 arranged normal to the rotational axis 20 of rotor 12, and a conductor 22 which is arranged in windings which will be further explained hereinafter. Conductor 22 terminates at its two ends at threaded terminals 24, for enabling external wiring (not shown) to be readily connected thereto. Terminals 24 include insulating bushings 26 to avoid short circuits.

Rotor 12 includes a central shaft 28 and two magnet groups 30. Magnet groups 30 may be of any number, as in the case of stators 14, the precise number not being important beyond matching the performance characteristics of the prime mover of generator 10 to the number and nature of stators 14.

Within each magnet group 30, there is a leading magnet 32, a plurality of central magnets 34, and a trailing magnet 36. Like poles of each one of magnets 32,34,36 are arranged as follows. North pole P of leading magnet 32 is located at the forward face 38, facing in the leading direction, with respect to the direction of rotation, as represented by arrow 40. North poles P of central magnets 34 face radially outwardly. North poles P of trailing magnets 36 are located at rear face 42, facing in the trailing direction.

Thus, each stator 14 is subjected to a north pole only as each magnet group 30 passes during rotation. This causes a consistent magnetic polar field to be imposed upon each stator 14, and parasitic internal losses are minimized.

The particular configuration of magnets called for in the present invention may be problematic to construct, in that some shapes resist successful magnetization. For this reason, it may be necessary to form a magnet in the half-moon configuration shown for magnets 32,36, or in any other shape or configuration required to produce a magnet having poles arranged as required.

Figure 2:
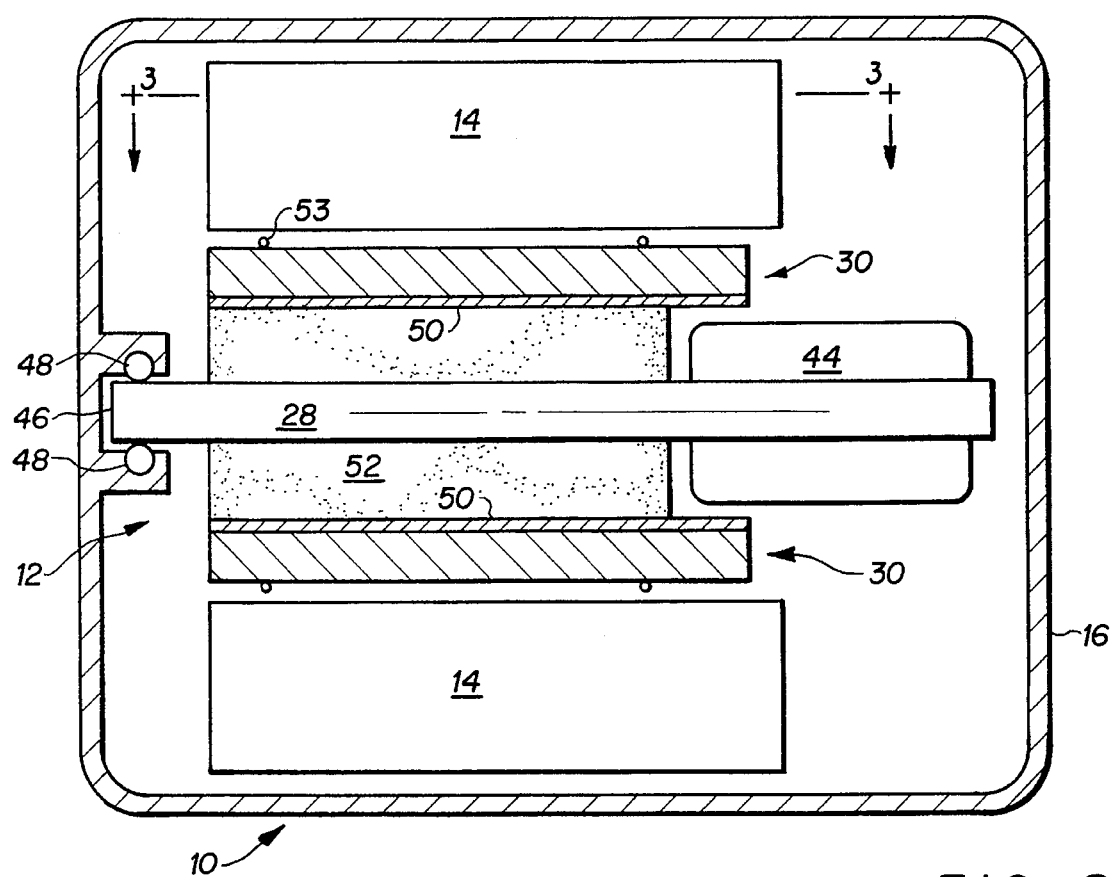
FIG. 2 is a diagrammatic, side elevational view of the invention, partly in cross section and partly broken away to reveal cross sectional detail of the stator.

FIG. 2 shows the relationships among rotor 12, stators 14, and housing 16. Also shown are shaft 28, which is common to both rotor 12 and to a driving motor 44. Motor 44 is secured to housing 16 by any suitable mounting (not shown), and includes internal bearings (not shown). The forward end 46 of shaft 28 is supported on bearings 48.

Rotor 12 is seen to be quite long, and magnet groups 30 partly surround motor 44 circumferentially. This enables magnetic attraction to stabilize rotor 12 at high rotational speeds.

Also seen in this view is a partial metal sleeve or base member 50, which encircles the epoxy core 52 of rotor 12 and is located beneath the magnets. Sleeve 50 is a structural member both reinforcing rotor 12, and providing a convenient, magnetic foundation for setting individual magnets in place during assembly.

The arrangement of magnets seen in FIG. 1 is not easily assembled manually, since mutual repulsion of individual magnets has a tendency to distort the orderly placement of the magnets in this arrangement. Sleeve 50 also counteracts centrifugal forces tending to urge magnets in a radial direction, due to magnetic attraction between the magnets and sleeve 50. Magnets are also retained in place by a wire 53 encircling rotor 12.

Figure 3:
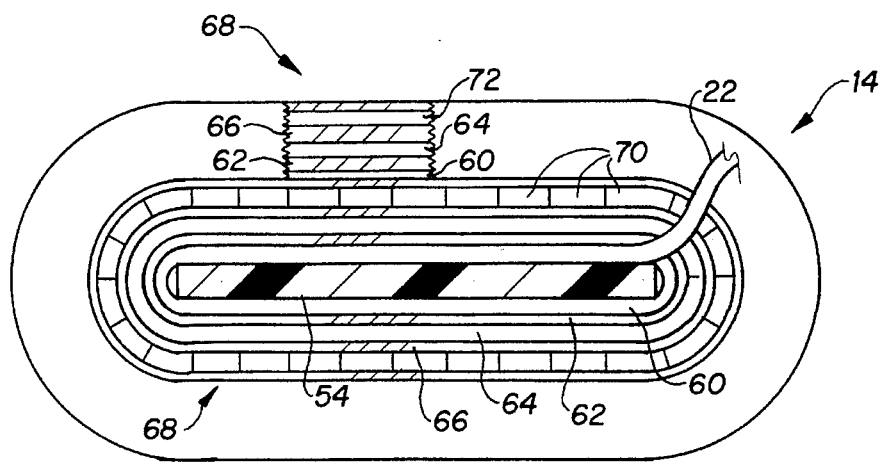
FIG. 3 is a diagrammatic, top cross sectional detail view of the stator, taken along line 3—3 of from FIG. 2, drawn to enlarged scale.

Construction of stators 14 will now be discussed, with reference to FIGS. 3 and 4. A flat, non-conductive member 54 serves as a base or foundation for winding conductor 22. Starting at stator proximal or outer end 56 (see FIG. 1), conductor 22 is wound around member 52 to stator distal or inner end 58 (see FIG. 1). This innermost primary winding 60 is covered with a first layer 62 of insulation.

Figure 4:
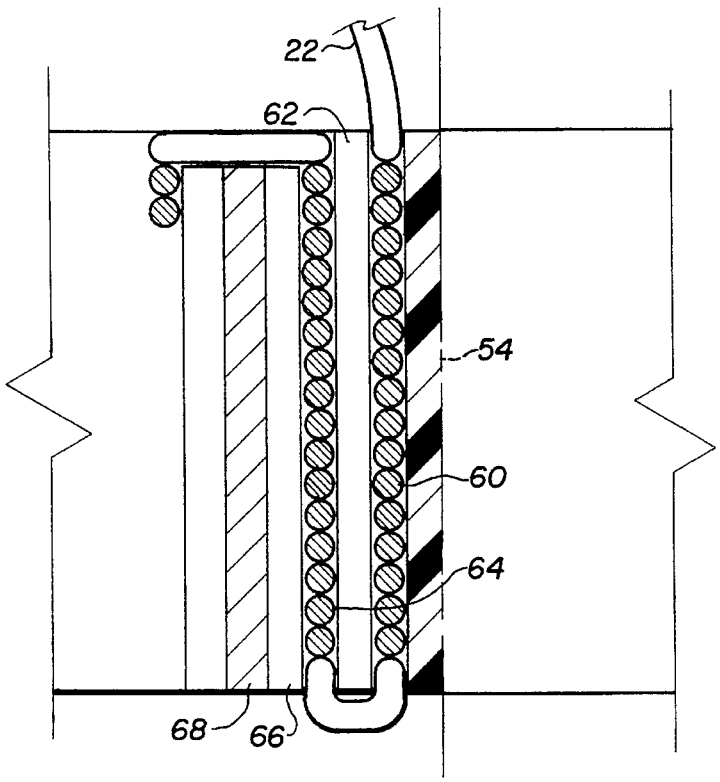
FIG. 4 is a diagrammatic, side cross sectional view of the stator, with some elements exaggerated for clarity, and drawn to enlarged scale.

As clearly seen in FIG. 4, conductor 22 is passed over insulation layer 62, and is then wound around insulation 62 to form a second primary winding 64 extending back to proximal end 56. A second layer 66 of insulation is then placed over second primary winding 64. It will be appreciated that conductor 22 of each stator is a single conductive filament.

A magnetic core 68 is then placed around second layer 66, circumferentially surrounding the same. Magnetic core 68 may comprise a series of parallel strips 70 (see FIG. 3) arranged parallel to one another. Alternatively, core 68 may comprise a continuous sheet, as indicated at 72.

Inner and second primary windings 60,64, combined with magnetic core 68 and associated insulation layers 62,66 form a core assembly. Stator 14 may be constructed to include a plurality of concentrically arranged successive core assemblies including windings and cores, there always being provided insulation layers disposed between each successive winding and an adjacent successive core. FIG. 3 illustrates an example of this construction.

Where plural winding and core units are employed, the core is bored, truncated, or otherwise modified to enable conductor 22 to pass to the next winding. This enables all windings to be formed from a single continuous conductive filament 22.

Figure 5:
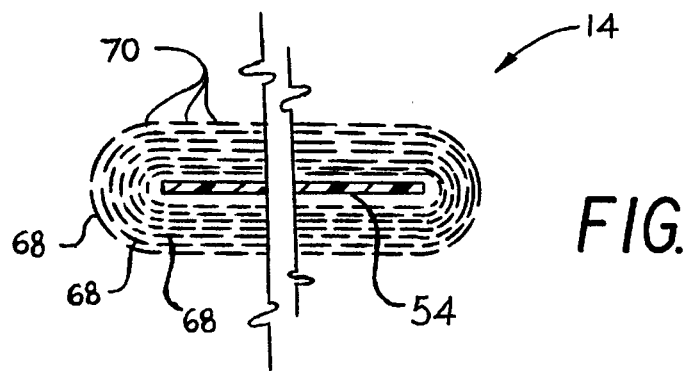
FIG. 5 is a diagrammatic, top cross sectional detail view of the stator similar to the view of FIG. 3, illustrating a preferred construction in which many concentrically arranged core members are employed.

FIG. 5 illustrates a preferred embodiment of stator 14, in which base element 54 is surrounded by many windings (see FIG. 3) and cores 68. The concentric arrangement of windings interspersed among core members enables stator 14 to remain cool when operating. Each core 68 comprises a large number of parallel strips 70.

Figure 6:
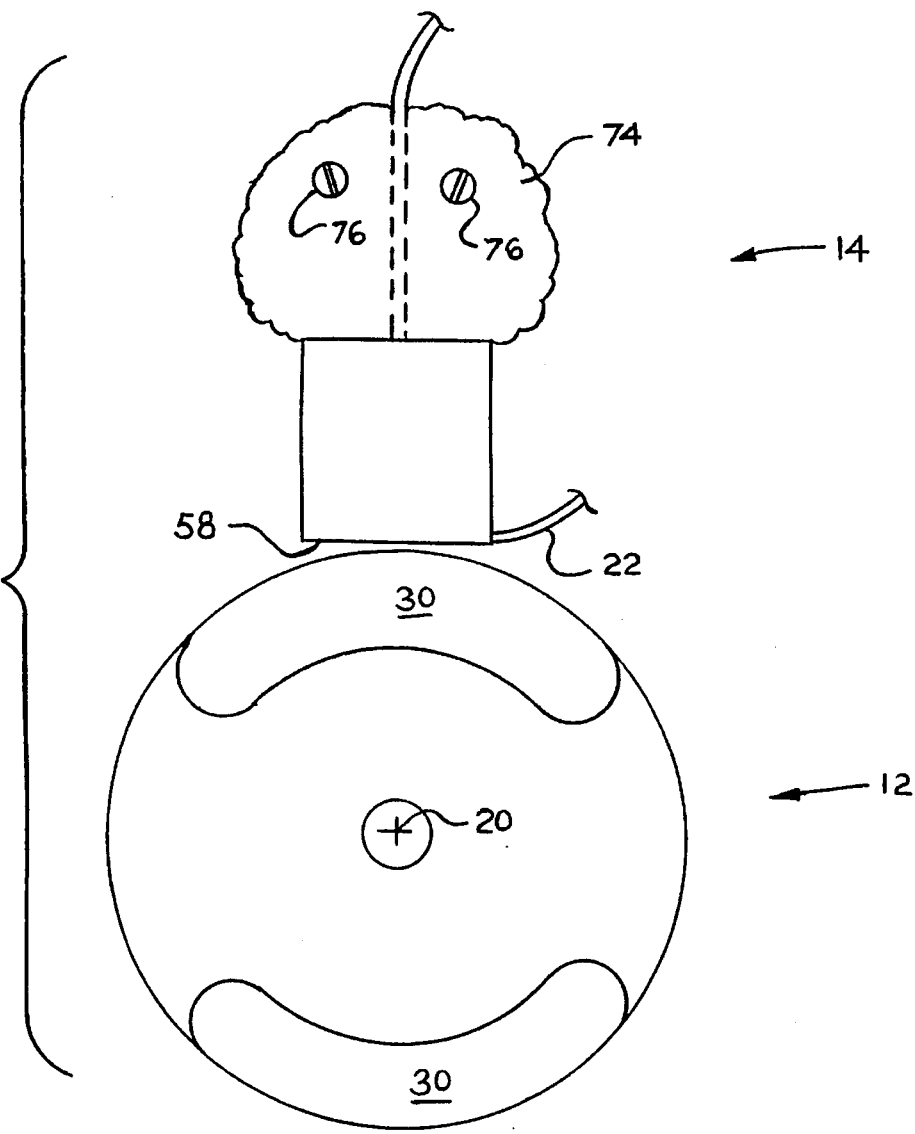
FIG. 6 is a diagrammatic, end elevational detail view of the generator showing a preferred embodiment of a stator.

FIG. 6 illustrates a preferred stator construction which enables ready addition and removal of stators, for varying generator output characteristics. Stator 14 includes a large base 74 made from a non-conductive material, such as epoxy. Base 74 is drilled so that screws 76 pass therethrough, for attachment by any suitable method to a wall of housing 16 (see FIG. 2).

The housing wall can be drilled and tapped to accommodate a variety of numbers and locations of stators 14. Alternatively, nuts having threaded holes can be located within housing 16, so that open wall penetrations are eliminated while still providing preformed stator attachment points.

Stator 14 may also be wound such that the final winding winds only once around a core. In this event, conductor 22 will terminate at end 58. Conductor 22 then extends back to a terminal 24 (see FIG. 1) directly therefrom.

It will be apparent to those of skill in the art that the number of stators, magnets and magnet groups, and winding and core units may be varied to suit the desired characteristics of generator 10. Also, the relative size and precise configuration of these elements may similarly be varied.

It is to be understood that the present invention is not limited to the embodiments described above, but encompasses any and all embodiments within the scope of the following claims.

I claim:

1. A generator for receiving rotary mechanical energy and generating electrical power responsive thereto, comprising:

a housing;

a rotor centrally disposed within said housing, said rotor having a circumference and a shaft rotatably secured to a motor, said rotor comprising a plurality of magnet groups comprising a plurality of individual magnets each having a north pole and a south pole, said magnet groups spaced equidistantly about said circumference, each of said magnet groups comprising a leading magnet having a leading surface, at least one central magnet, and a trailing magnet having a trailing surface; and at least one stator having a proximal end adjacent to said housing and a distal end adjacent to said rotor, said at least one stator secured within said housing at a static location with respect to and in close proximity to said rotor, said stator having an innermost primary winding extending from said stator proximal end to said stator distal end, a first layer of insulation covering said innermost primary winding, a second primary winding extending from said stator distal end back to said stator proximal end, said first layer of insulation disposed between said innermost primary winding and said second primary winding, a second layer of insulation covering said second primary winding, and a first magnetic core circumferentially surrounding said second layer of insulation;

wherein like poles of each said leading magnet face in the leading direction, like poles of each said trailing magnet face in the trailing direction, and like poles of said at least one central magnet face radially outwardly, whereby a consistent magnetic polar field is imposed upon said stator.

2. The generator according to claim 1, said at least one stator includes a plurality of stators arranged radially about said rotor.

3. The generator according to claim 1, said innermost primary winding and said second primary winding formed from a single continuous conductor.

4. The generator according to claim 1, said first magnetic core formed from a continuous sheet of magnetizable material.

5. The generator according to claim 1, said first magnetic core formed from a plurality of strips of magnetizable material arranged parallel to one another.

6. The generator according to claim 1, said rotor having an axis of rotation, and said stator having a longitudinal axis disposed normal to said rotor axis of rotation.

7. The generator according to claim 2, each of said stators comprising a plurality of concentrically arranged successive core assemblies including windings and cores, wherein each said layer of insulation being disposed between each successive said windings and an adjacent successive said core.

8. The generator according to claim 1, said leading magnets having a field strength greater than that of said at least one central magnet.

9. The generator according to claim 1, said trailing magnets having a field strength greater than that of said at least one central magnet.

10. The generator according to claim 1, there being at least one wire encircling said rotor, whereby said magnets are retained thereto and are protected against centrifugal forces.

11. The generator according to claim 1, further including a driving motor, said magnet groups circumferentially partly surrounding said driving motor.

12. The generator according to claim 1, said rotor further comprising a magnetic base member located beneath said magnets.

13. The generator according to claim 1, each said stator including a non-conductive base having means defining mounting holes therein for accepting fasteners.

14. The generator according to claim 7, each said core comprising a plurality of strips of magnetizable material arranged parallel to one another.

15. A rotor for a permanent magnet generator, said rotor having a circumference, said rotor comprising a plurality of magnet groups comprising a plurality of individual magnets each having a north pole and a south pole, said magnet groups spaced equidistantly about said circumference, each said magnet group comprising a leading magnet having a leading surface, at least one central magnet, and a trailing magnet having a trailing surface;

wherein like poles of each said leading magnet face in the leading direction, like poles of each said trailing magnet face in the trailing direction, and like poles of said at least one central magnet face radially outwardly, whereby a consistent magnetic polar field is imposed upon said stator.

\* \* \* \* \*